United States Patent
Thöne

[11] Patent Number: 6,126,739
[45] Date of Patent: Oct. 3, 2000

[54] DISPERSIONS AND THE USE THEREOF IN CONCRETE MIXTURES

[76] Inventor: Gerd Thöne, Akazienstrasse 31, D-32105 Bad Salzuflen, Germany

[21] Appl. No.: 09/091,810

[22] PCT Filed: Dec. 18, 1996

[86] PCT No.: PCT/DE96/02439

§ 371 Date: Aug. 25, 1998

§ 102(e) Date: Aug. 25, 1998

[87] PCT Pub. No.: WO97/23433

PCT Pub. Date: Jul. 3, 1997

[30] Foreign Application Priority Data

Dec. 22, 1995 [DE] Germany .......................... 195 49 294

[51] Int. Cl.$^7$ ................................................. C04B 24/16
[52] U.S. Cl. .......................... 106/724; 106/725; 106/823; 264/333; 264/DIG. 43
[58] Field of Search ................................... 106/823, 724, 106/725; 264/DIG. 43, 333

[56] References Cited

U.S. PATENT DOCUMENTS

| | | |
|---|---|---|
| 4,851,456 | 7/1989 | Dean . |
| 5,244,304 | 9/1993 | Weill et al. . |

FOREIGN PATENT DOCUMENTS

| | | |
|---|---|---|
| 247284 | 1/1988 | Czechoslovakia . |
| 460744 | 12/1991 | European Pat. Off. . |
| 53110641 | 9/1978 | Japan . |
| 56063855 | 5/1981 | Japan . |
| 60096559 | 5/1985 | Japan . |
| 2055824 | 3/1996 | Russian Federation . |

*Primary Examiner*—Paul Marcantoni
*Attorney, Agent, or Firm*—Thorp Reed & Armstrong, LLP

[57] ABSTRACT

An aqueous dispersion containing a latex, an alkaline earth metal formate, cellulose ether and lauryl sulphonate can be added to a concrete mixture as an auxiliary agent to make the concrete more flexible and reduce shrinkage during setting. Adding the dispersion to concrete mixtures allows also addition of fillers hitherto regarded as toxic to cement.

23 Claims, No Drawings

DISPERSIONS AND THE USE THEREOF IN CONCRETE MIXTURES

BACKGROUND OF THE INVENTION

1. Field of the Invention

The invention relates to aqueous dispersions, with which the concrete can be made more flexible and with which the shrinkage of the concrete mixture can be reduced during setting and with which it is possible to use filling agents in the concrete mixtures hitherto regarded as toxic to cement.

2. Description of the Related Art

Due to growing industrialization in most countries of the world and the desire for mobility of human beings, street and road construction is growing in importance. The most desired road construction material is bitumen. Bitumen has the advantage of being flexible enough to adapt to the movement of the subsoil. Therefore roads, which contain bitumen, do not form any cracks and/or edge projections. Furthermore, a bitumen layer has proven to be exceptionally resistant to abrasion enabling streets with a bitumen layer to last for a long time. The disadvantage of bitumen is its very high price and its lack of availability in many countries. Additionally, bitumen is not suitable as a construction material for road construction purposes in many countries of the south and far eastern hemisphere, due to the fact that it lacks a resistance to heat.

An alternative road construction material is concrete. In comparison to bitumen, concrete is remarkably lower in price, and the kind of materials needed for concrete mixtures, e.g., cement, water and filling agents such as sand, are more available than bitumen in large parts of the world. Additionally, concrete does not turn soft even at extreme exposure to sunlight. To be able to build roads made of concrete, the subsoil under the concrete slab has to be very solid. Otherwise, the concrete slabs will either break or they will settle in such a way that edge projections may occur. Broken slabs or edge projections may cause extreme stress to motor vehicles travelling on the road, and are annoying to drivers. The process of hardening the subsoil is an extremely cost effective procedure, whereby the native soil is replaced by a compressible material, for example, sand.

There have been many tests with additives to make concrete as flexible as bitumen. AU-A-35121/93 shows a mixture which is added to a concrete mixture to make concrete more flexible and reduce shrinkage during setting. The mixture mainly consists of two components: mainly of chloride salts and an alkali silicate (waterglass), preferably sodium silicate. The two components are premixed and then added to a concrete mixture made of cement, water and sand. The final mixture can be used, for example, in road construction. This procedure has the disadvantage that the two components of the mixture react with each other during the premixing process. Additionally, the silicate starts setting before it comes into contact with the concrete mixture so that the actual effect of this mixture in the concrete mixture is limited. Furthermore problems may arise because waterglass is treated as a dangerous substance and may only be processed by those using gloves, safety glasses and an apron. These safety precautions also have to be taken during transport.

SUMMARY OF THE INVENTION

It is therefore required to find an auxiliary agent, which is not rated as a dangerous substance, which is recognized as being safe for the environment, and which also makes concrete more flexible and reduces shrinkage of the concrete mixture during setting. This task is solved according to the invention by providing an aqueous dispersion, which contains:

a.) 83.0–96.0 wt-% (percent by weight), related to the total weight of the dispersion, water,
b.) 1.0–6.0 wt-%, related to the total weight of the dispersion, of a 30–70 wt-% aqueous, synthetic latex,
c.) 1.0–7.2 wt-%, related to the total weight of the dispersion, of an alkaline earth metal formate, preferably calcium formate,
d.) if need be, 0.2–1.2 wt-%, related to the total weight of the dispersion, of a cellulose ether,
e.) 0.02–0.12 wt-%, related to the total weight of the dispersion, lauryl-sulfonate,
f.) if need be, 0.6–1.2 wt-%, related to the total weight of the dispersion, of a commonly used preservative agent,
g.) if need be, 0.25–0.6 wt-%, related to the total weight of the dispersion, of a commonly used foam separator,
h.) if need be, 0.29–1.0 wt-%, related to the total weight of the dispersion, of a, preferably 50–60 wt-%, aqueous paraffin emulsion, whereby the total weight of all components of the dispersion has to add up to 100 wt-%.

Preferably the aqueous dispersion according to the invention contains:

85.0–90.0 wt-% of component a,
2.0–5.0 wt-% of component b,
2.0–6.0 wt-%, of component c,
if need be, 0.3–1.0 wt-%, of component d,
0.03–0.08 wt-% of component e,
if need be, 0.8–1.0 wt-%, of component f,
if need be, 0.3–0.5 wt-%, of component g,
if need be, 0.5–0.8 wt-%, of component h.

Whereby the total weight of all components of the dispersion has to add up to 100 wt-%.

Preferably, the synthetic latex is a polystyrene-butadiene-copolymer latex as the alkaline earth metal is calcium formate, and the preservative agents are 2-n-octyl-4-isothiazole-3-one dissolved in propyl glycol.

A further subject matter of the invention is a concrete mixture containing:

a.) 0.01–0.5 liter preferably 0.05–0.15 liter of the dispersion according to the invention per kg cement
b.) cement,
c.) filling agent
d.) if need be, water, where the components of the concrete mixture, and, after it has set, the concrete are used in the usual amounts. The concrete mixture according to the invention is preferably produced in such a way that the filling agent and, if need, be water are mixed with each other, prior to adding the dispersion according to the invention. Any other order of mixing the components is also possible.

A further subject matter of the invention is the production of construction material, preferably slabs or stones, from the concrete mixture according to the invention. The concrete mixture according to the invention can further be used for all kinds of concrete building, preferably street and road construction and fastening construction. Accordingly, a further subject matter of the invention is this use and the respective concrete building, preferably street and road construction and other fastening coverings or building.

With the dispersion according to the invention the following advantages are achieved:

To only one auxiliary agent has to be added a concrete mixture. The agent does not have be premixed to make the concrete more flexible and to reduce the shrinkage during setting. Therefore, the costs for freight and storage are reduced.

The dispersion according to the invention is not classified as a dangerous material, and, therefore, can be processed without protection measures.

The dispersion according to the invention is generally recognized as safe for the environment.

A concrete mixture according to the invention sets very quickly.

With the dispersion according to the invention, it is possible to produce a co-mixture with filling agents, which hitherto had been regarded as toxic to cement.

Common filling agent, such as sand, can be used in the concrete mixture, but furthermore every kind of soil, contaminated or not contaminated, and/or materials such as bauxite, laterite, vulcanized ash, bimos and ash from combustion plants can be used as a filling agent.

If the water part of the filling agent is sufficient to cover the amount of water needed for the concrete mixture according to the invention, then no additional water has to be added to the concrete mixture according to the invention.

With the concrete mixture according to the invention construction material and concrete building components of any kind can be produced, preferably street and road layers, in such a way that the excavated earth of the building site and/or sand or soil-like material, which are available at the building site, can be used as filling agents instead of the common filling agents normally used in the concrete mixture.

EXAMPLE I

To be able to check to what extent the mechanic characteristics, especially the elasticity and the shrinkage of a concrete has been changed by the dispersion according to the invention and to what extent it was possible to reduce the shrinkage of the concrete mixture, a test with and without the addition of the aqueous dispersion was performed.

Initially, a concrete mixture was produced, which contained the following components:
20 kg cement,
100 of sand, and;
5 liters of water.

After that, the concrete mixture was divided in half and placed in two separate vats.

One of the concrete mixtures was left as it was, while the other concrete mixture was mixed with a liter of the dispersion according to the invention, which was composed of the following:
(a) 87.6 wt-% (percent by weight), related to the total weight of the dispersion, water,
(b) 4.0 wt-%, related to the total weight of the dispersion, of a 50 wt-% aqueous, synthetic styrol/butadiene latex,
(c) 5.0 wt-%, related to the total weight of the dispersion, calcium formate,
(d) 1.0 wt-%, related to the total weight of the dispersion, cellulose ether,
(e) 1.0 wt-%, related to the total weight of the dispersion, 2-n-octyl-4-isothiazol-3-one dissolved in propylene glycol,
(f) 0.39 wt-%, related to the total weight of the dispersion, poly(dimethyl siloxane),
(g) 0.01 wt-%, related to the total weight of the dispersion, lauryl sulfonate,
(h) 1.0 wt-%, related to the total weight of the dispersion, of a 60 wt-%, aqueous paraffin emulsion.

After that the concrete mixture according to the invention and the conventional concrete mixture were each poured into 50×20×1 cm (length, width, depth) wood molds measures, in which the concrete mixture set 10 slabs were produced.

A visual assessment of the concrete slabs revealed that the concrete slabs according to the invention had shrunk less than the conventional concrete slabs. After that, the 10 concrete slabs were tested in a machine by fixing one end and exposing the other end to increasing pressure from a hydraulic die, 45 cm away from the location of clamping, until the slab broke. During this test the deformation of the concrete slabs were measured optically. It appeared that the concrete slabs according to the invention comprised a higher ductility before the fracture of 2.5 on average.

EXAMPLE 2

As mentioned before, it is possible to use substances as filling agents in concrete mixtures with the dispersion according to the invention, which were hitherto regarded as toxic to cement. To illustrate this fact, three concrete mixtures were produced, which each contained 20 kg of cement and 5 liters of water. As a filling agent mixture I contained 100 liters of commercially available building sand, mixture 2,100 liters of excavated native soil of a building site and mixture 3, 1.00 liters of ash from a combustion plant. The concrete mixtures were intensively premixed in a concrete mixing machine and then mixed in a vat with a liter of the dispersion according to example 1 and molded into slabs in the molds described in example 1. A visual assessment of 10 concrete slabs revealed that the shrinkage of the concrete mixtures during setting was low in all cases. After that, the slabs were subjected to the different mechanical testing procedures, for example, resistance to pressure, ductility and surface hardness, whereby it appeared that the mechanical characteristics of all concrete slabs showed were comparable.

I claim:

1. An aqueous dispersion comprising:
83.0–96.0 wt-% (percent by weight), based on the total weight of the dispersion, water;
1.0–6.0 wt-% based on the total weight of the dispersion, of a 30–70 wt-% aqueous, synthetic latex;
1.0–7.2 wt-%, based on the total weight of the dispersion, of an alkaline earth metal formate; and,
0.02–0.12 wt-%, based on the total weight of the dispersion, lauryl-sulfonate;
whereby the weight of all components of the dispersion totals 100 wt-%.

2. The aqueous solution of claim 1 further comprising:
0.2–1.2 wt-%, based on the total weight of the dispersion, of a cellulose ether.

3. The aqueous solution of claim 1 further comprising:
0.6–1.2 wt-%, based on the total weight of the dispersion, of a preservative agent.

4. The aqueous solution of claim 1 further comprising:
0.25–0.6 wt-% based on the total weight of the dispersion, of a foam separator.

5. The aqueous solution of claim 1 further comprising:
0.2–1.0 wt-%, based on the total weight of the dispersion, of a 50–60 wt-%, aqueous paraffin emulsion.

6. The aqueous dispersion according to claim 1 comprising:
85.0–90.0 wt-% of water;
2.0–5.0 wt-% of 30–70 wt-% aqueous, synthetic latex;
2.0–6.0 wt-%, of calcium formate;
0.3–1.0 wt-%, of cellulose ether;

0.03–0.08 wt-% of lauryl-sulfonate;
0.8–1.0 wt-%, of a preservative agent;
0.3–0.5 wt-% of foam separator; and,
0.5–0.8 wt-% of an aqueous paraffin emulsion
whereby the weight of all components of the dispersion totals 100 wt-%.

7. The aqueous dispersion according to claim 1, wherein a polystyrene-butadiene latex is used as a synthetic latex and as preservative agents 2-n-octyl-4-isothiazole-3-one dissolved in propyl glycol are used.

8. A concrete mixture comprising:
0.01–0.5 liter per kg cement of a dispersion comprising:
83.0–96.0 wt-%, based on the total weight of the dispersion, water:
1.0–6.0 wt-%, based on the total weight of the dispersion, of a 30–70 wt-% aqueous, synthetic latex;
1.0–7.2 wt-%, based on the total weight of the dispersion, of an alkaline earth metal formate; and,
0.02–0.12 wt-%, based on the total weight of the dispersion, lauryl-sulfonate
whereby the weight of all components of the dispersion totals 100 wt-%,
cement
filling agent and
water.

9. The concrete mixture according to claim 8 wherein the filling agent is at at least one of non-contaminated soil, contaminated soil, bauxite, laterite, or ash.

10. The concrete mixture according to claim 8 wherein at least a portion of the required content of water is in the filling agent.

11. A concrete mixture comprising:
0.05–0.15 liter per kg cement of a dispersion comprising:
83.0–96.0 wt-% (percent by weight), based on the total weight of the dispersion, water;
1.0–6.0 wt-%, based on the total weight of the dispersion, of a 30–70 wt-% aqueous, synthetic latex;
1.0–7.2 wt-%, based on the total weight of the dispersion, of an alkaline earth metal formate; and,
0.02–0.12 wt-%, based on the total weight of the dispersion, lauryl-sulfonate;
whereby the weight of all components of the dispersion totals 100 wt-%;
cement,
filling agent and
water.

12. A process for the production of a building material, comprising the steps of:
Preparing a concrete mixture comprising:
0.01–0.5 liter per kg cement of a dispersion comprising:
83.0–96.0 wt-%, based on the total weight of the dispersion, water;
1.0–6.0 wt-%, based on the total weight of the dispersion, of a 30–70 wt-% aqueous, synthetic latex;
1.0–7.2 wt-%, based on the total weight of the dispersion, of an alkaline earth metal formate; and,
0.02–0.12 wt-%, based on the total weight of the dispersion, lauryl-sulfonate;
whereby the weight of all components of the dispersion totals 100 wt-%,
cement
filling agent and
water,
Mixing said concrete mixture;
Pouring said concrete mixture into a mold; and
Allowing said concrete mixture to set.

13. A process for the production of a slab-shaped building material, comprising the steps of:
Preparing of a concrete mixture comprising:
0.01–0.5 liter per kg cement of a dispersion comprising:
83.0–96.0 wt-%, based on the total weight of the dispersion, water;
1.0–6.0 wt-%, based on the total weight of the dispersion, of a 30–70 wt-% aqueous, synthetic latex;
1.0–7.2 wt-%, based on the total weight of the dispersion, of an alkaline earth metal formate; and,
0.02–0.12 wt-%, based on the total weight of the dispersion, lauryl-sulfonate;
whereby the weight of all components of the dispersion totals 100 wt-%,
cement
filling agent and
water,
Mixing said concrete mixture;
Pouring said concrete mixture into a slab-shaped mold; and
Allowing said concrete mixture to set.

14. A process for preparing a construction, comprising the steps of:
Preparing a concrete mixture comprising:
0.01–0.5 liter per kg cement of a dispersion comprising:
83.0–96.0 wt-%, based on the total weight of the dispersion, water;
1.0–6.0 wt-%, based on the total weight of the dispersion, of a 30–70 wt-% aqueous, synthetic latex;
1.0–7.2 wt-%, based on the total weight of the dispersion, of an alkaline earth metal formate; and,
0.02–0.12 wt-%, based on the total weight of the dispersion, lauryl-sulfonate;
whereby the weight of all components of the dispersion totals 100 wt-%,
cement
filling agent and
water;
Mixing said concrete mixture;
Forming said concrete mixture to produce said construction; and
Allowing said concrete mixture to set.

15. A process for the production of a building material, comprising the steps of:
Preparing a concrete mixture comprising:
0.05–0.15 liter per kg cement of a dispersion comprising:
83.0–96.0 wt-% (percent by weight), based on the total weight of the dispersion, water;
1.0–6.0 wt-%, based on the total weight of the dispersion, of a 30–70 wt-% aqueous, synthetic latex;
1.0–7.2 wt-%, based on the total weight of the dispersion, of an alkaline earth metal formate; and,
0.02–0.12 wt-%, based on the total weight of the dispersion, lauryl-sulfonate;

whereby the weight of all components of the dispersion totals 100 wt-%, cement, filling agent and water;

Mixing said concrete mixture;

Forming said building material from said concrete mixture; and

Allowing said concrete mixture to set.

16. A process for the production of a stone-shaped building material, comprising the steps of:

Preparing a concrete mixture comprising:
- 0.05–0.15 liter per kg cement of a dispersion comprising:
    - 83.0–96.0 wt-% (percent by weight), based on the total weight of the dispersion, water;
    - 1.0–6.0 wt-%, based on the total weight of the dispersion, of a 30–70 wt-% aqueous, synthetic latex;
    - 1.0–7.2 wt-%, based on the total weight of the dispersion, of an alkaline earth metal formate; and,
    - 0.02–0.12 wt-%, based on the total weight of the dispersion, lauryl-sulfonate;
    - whereby the weight of all components of the dispersion totals 100 wt-%,
- cement,
- filling agent and
- water;

Mixing said concrete mixture;

Pouring said concrete mixture into a stone-shaped mold; and

Allowing said concrete mixture to set.

17. The concrete mixture according to claim 11 wherein said filling agent is at least one of contaminated soil, uncontaminated soil, bauxite, laterite, or ash.

18. The concrete mixture according to claim 11 wherein at least a portion of the required content of water is in the filling agent.

19. An aqueous dispersion comprising by weight based on the total weight of the dispersion:

83.0–96.0 wt-% water;

1.0–6.0 wt-% of a 30–70 wt-% aqueous synthetic latex;

0.02–0.12 wt-% lauryl sulfonate; and, at least one additive selected from the group consisting of, 1.0–7.2 wt-% of an alkaline earth metal formate, 0.2–1.2 wt-% of cellulose ether, 0.6–1.2 wt-% of a preservative agent, 0.25–0.6 wt-% of a foam separator, and 0.2–1.0 wt-% of a 50–60 wt-% aqueous paraffin emulsion;

whereby the weight of all the components of the dispersion totals 100 wt-%.

20. The concrete mixture of claim 9 wherein said ash is vulcanized ash.

21. The concrete mixture of claim 9 wherein said ash is combustion ash.

22. The concrete mixture of claim 9 wherein said ash is vulcanized ash.

23. The concrete mixture of claim 9 wherein said ash is combustion ash.

* * * * *